June 4, 1957 J. R. STILES 2,794,216
WALL-PANEL STRUCTURE
Filed July 18, 1955 3 Sheets-Sheet 1
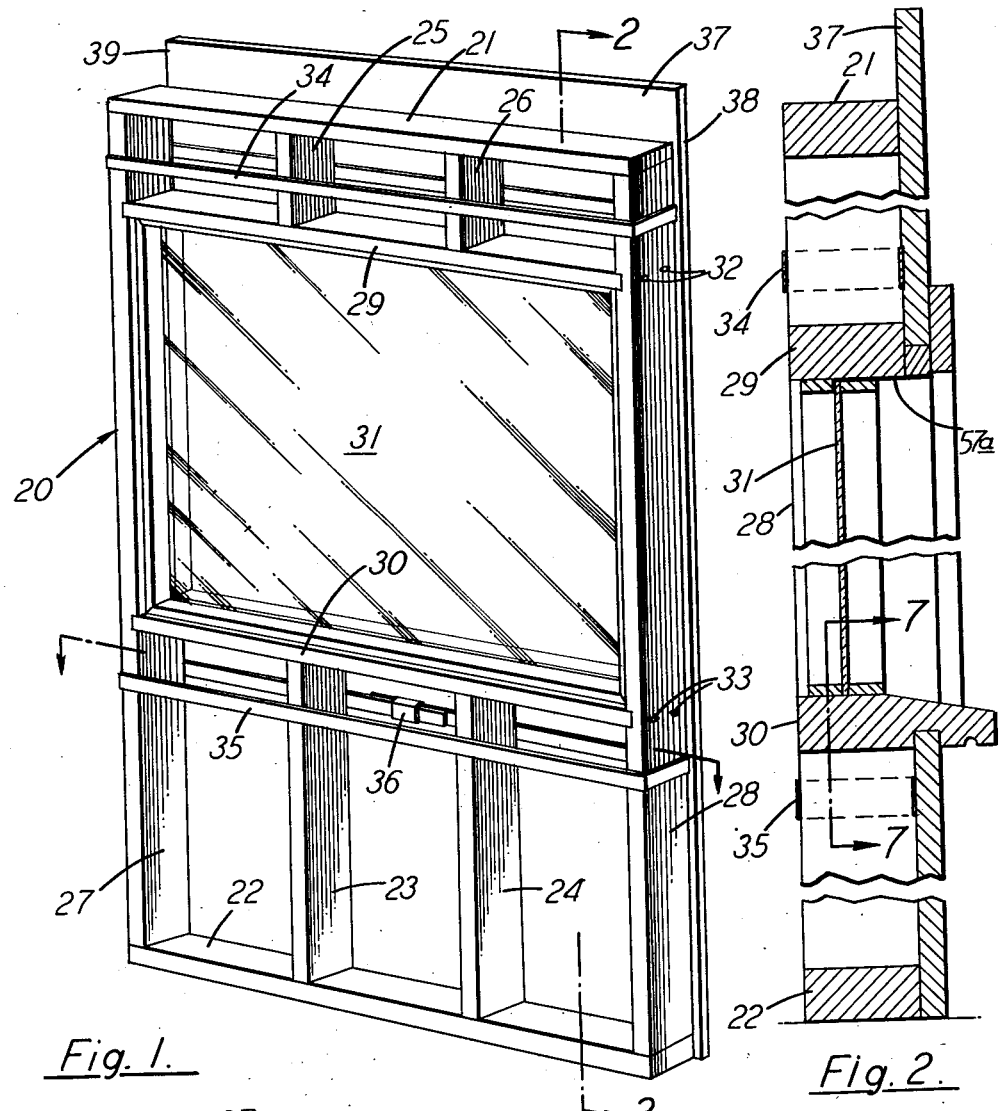
Fig. 1.
Fig. 2.
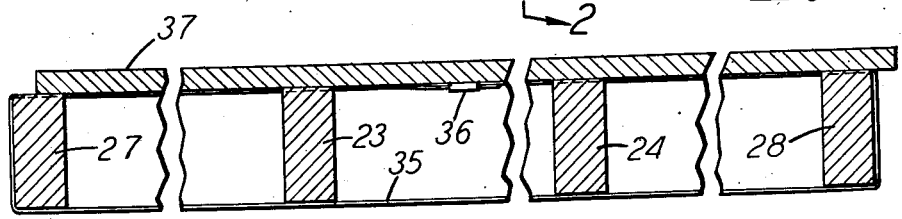
Fig. 3.
INVENTOR.
John R. Stiles
BY
Attorney

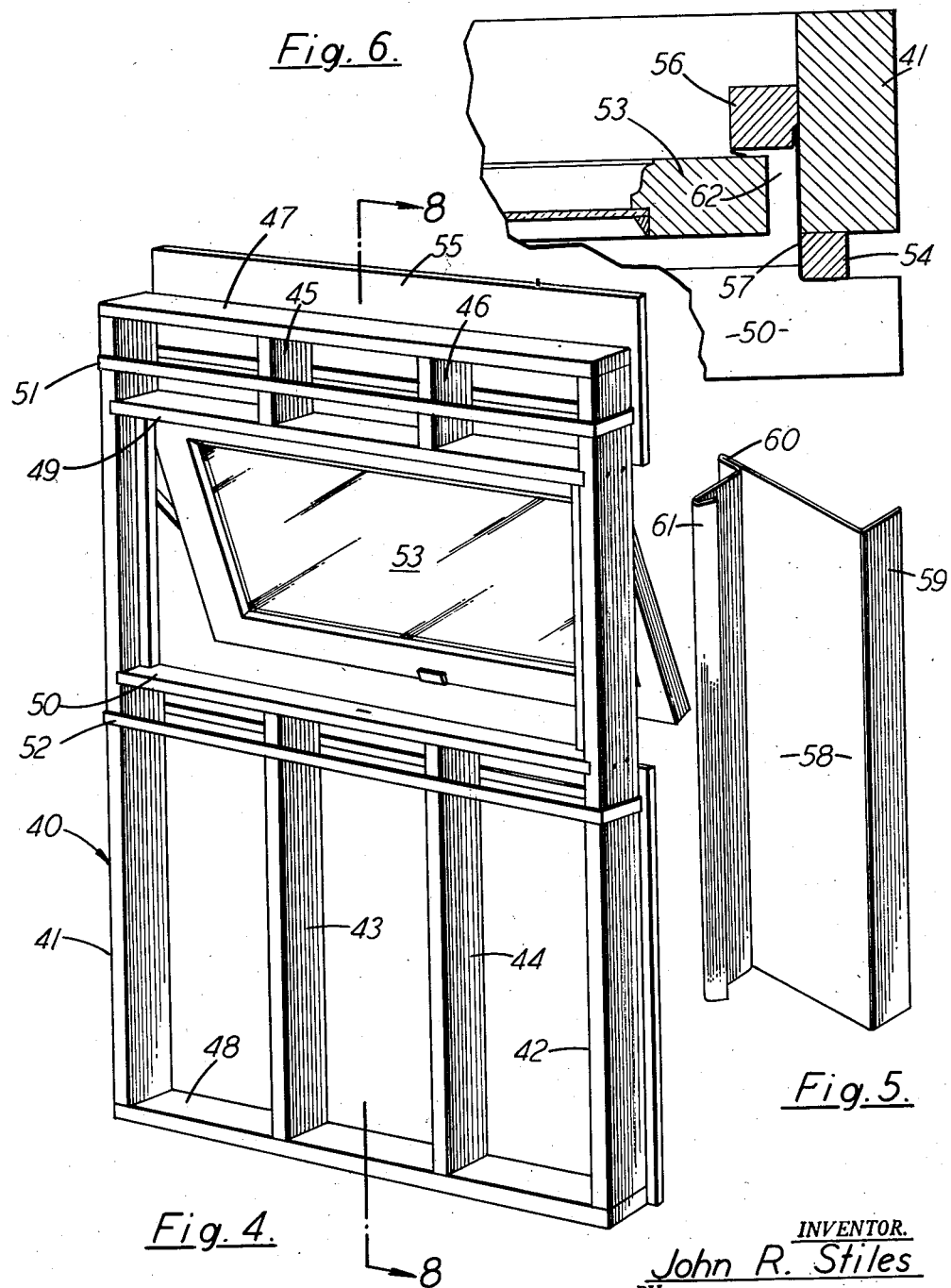

INVENTOR.
John R. Stiles

United States Patent Office 2,794,216
Patented June 4, 1957

2,794,216

WALL-PANEL STRUCTURE

John R. Stiles, Grand Rapids, Mich.

Application July 18, 1955, Serial No. 522,776

4 Claims. (Cl. 20—4)

This invention relates to the construction of buildings, and particularly to that type of semi-prefabricated structure in which a wall is formed from a series of initially separate elements. These are erected in position, and are then secured with respect to each other and to a stress-distribution beam extending along the wall above the elements. In general, this type of structure is not new, and has been developed primarily to minimize duplication of structural material. It is desirable, in order to carry this principle of construction to its logical conclusion, to include in each of the wall panels a complete structure which includes any windows, louvers, or similar installations. Adjustable windows involve a certain amount of operating mechanism that must be maintained in alignment, however, and the windows themselves must properly fit within their openings if this structural system is to be at all satisfactory in practice. The one problem that has seriously interfered with the furnishing of a complete wall element has been the tendency of such a unit to work out of alignment as it is transported and erected. All of the various conventional types of fastenings securing the structural members of the wall element unit together have in the past displayed such a tendency to work loose that the joints "open" and stay in that condition. It is common knowledge that two wooden members forming a butt joint, secured by nails intersecting the cross member and entering the other, are not capable of withstanding any substantial amount of torsion tending to create angular displacement of one member with respect to the other. Such a tendency causes the cross member to pivot upon one edge of the end of the joining member, and to partially lift the nail out of the piece which it engages. On the release of the torsion and the resumption of the perpendicular relationship, it will be noted that a space exists between the end of the one piece and the side of the cross member it had originally firmly engaged. Repeated applications of torsion result in gradually increasing this spacing to the point where the structure can no longer be relied upon for alignment. The nail is a very handy item, however, for preventing the lateral displacement of one piece with respect to another, and its low cost and ease of installation increase its value.

This invention provides means for maintaining the solidity of a butt joint sufficiently to inhibit the tendency for the pieces to separate under stresses of various kinds, and the maintenance of the solid engagement of the pieces makes the frame structure sufficiently reliable so that working window components may be mounted in it without requiring exceptional care in handling the units in transportation and erection.

The primary point of difference between the structural portions of a wall panel embodying this invention and conventional practice is the provision of a tension band, or a series of them, in a normally horizontal position and surrounding the entire wall panel after the components have been assembled. The tension in the band creates a constricting action tending to solidly hold the vertical stud members against the end faces of the horizontal members and thereby establish the rectangular relationship of the entire assembly. The nails, therefore, exhibit no tendency to work loose, since the tension of the band does not permit separation of the pieces under normal conditions. The band itself is similar to that used in the packaging industry to secure cartons in closed condition, and is ordinarily a steel strap on the order of a thirty second of an inch thick and a half inch to an inch wide, with the ends being secured by a crimped clip. In view of the fact that other structural elements are normally superimposed against the front and rear of the basic structural framing of a wall, the junction clip of the band is placed between vertical members so that the presence of other panel members against the basic framing will not be interfered with. The flexibility of the constricting band will permit it to deflect inwardly between the vertical members under the pressure created by the superimposing panel.

In summary, it is not the purpose of the band itself to maintain absolute rigidity of the wall component, but only to establish a strong tendency for it to resume its original rectangular configuration after distorting stresses (created in handling and erection) have been removed. As long as this condition exists, the panel will assume its proper position after being placed in conjunction with other panels, and it will be found that all of the working components of the windows and other built-in devices will still operate satisfactorily, and the several finished joists will still be properly closed and trim in their over-all appearance.

The several features of this inventinon will be analyzed in detail through a discussion of the particular embodiments illustrated in the accompanying drawings. In the drawings:

Figure 1 presents a perspective view of a wall panel embodying this invention.

Figure 2 is a fragmentary section on an enlarged scale, taken on the plane 2—2 of Figure 1.

Figure 3 is a fragmentary section on an enlarged scale, taken on the plane 3—3 of Figure 2.

Figure 4 illustrates a modified type of wall component from that illustrated in Figure 1.

Figure 5 illustrates, on an enlarged scale, a piece of metallic weather stripping utilized in conjunction with the unit illustrated in Figure 4.

Figure 6 presents a section on an enlarged scale showing the installation of the strip shown in Figure 5.

Figure 7:
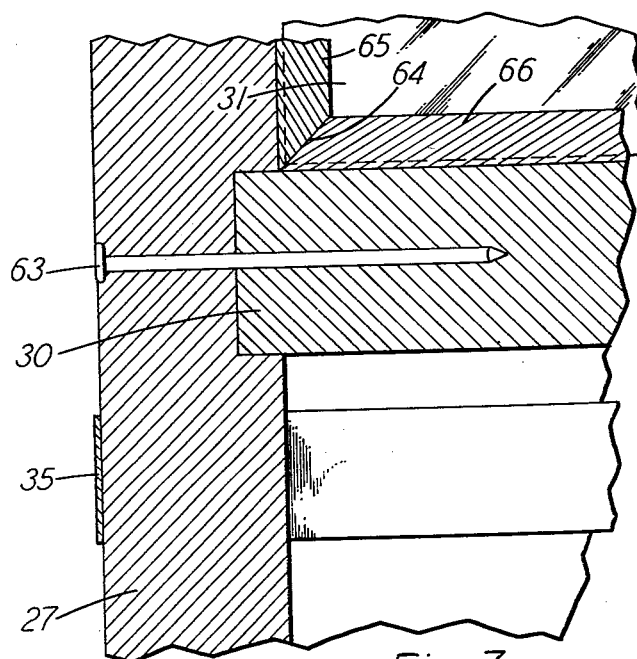

Figure 7 presents an enlarged view of the junction of horizontal and vertical members.

Figure 8:
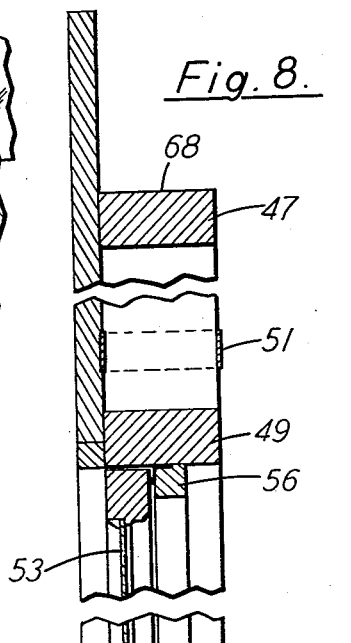

Figure 8 presents a fragmentary section on an enlarged scale taken on the plane 8—8 of Figure 4.

Figure 9:
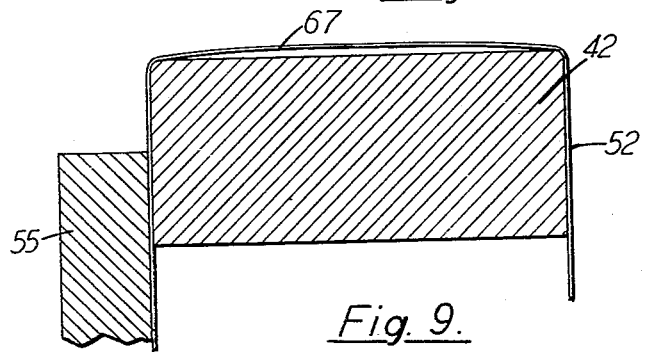

Figure 9 presents a section taken on the plane 9—9 of Figure 8, on an enlarged scale.

Figure 10:
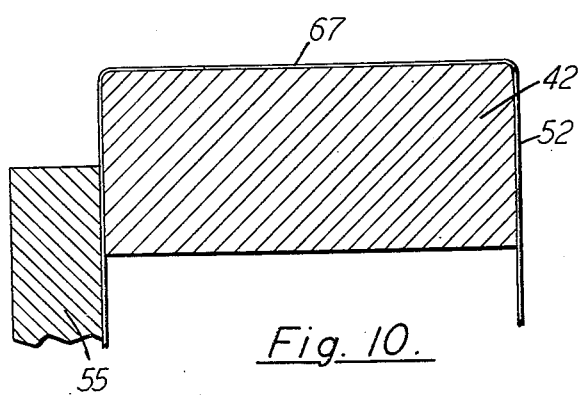

Figure 10 presents a section similar to that of Figure 9, and illustrating the effect of the expansion of wooden members resulting in increase in tension in the band.

Referring to Figures 1, 2, and 3, a wall panel element generally indicated at 20 may be considered as including a frame established by the upper and lower members 21 and 22, respectively, the spaced vertical members 23, 24, 25, and 26, the vertical stud members 27 and 28 at the sides of the panel, and the normally horizontal members 29 and 30 defining the area in which the window unit generally indicated at 31 is positioned. The members 29 and 30 are received in slots in the studs 27 and 28 as shown, and are secured against lateral displacement through the use of nails as indicated at 32 and 33 in Figure 1. Steel tension bands 34 and 35 surround the framework after the assembly thereof, with their ends being brought together and secured with a crimped junction clip as shown at 36, the clip being disposed between the vertical members 23 and 24. The constricting action generated by the tension in the bands 34 and 35 will apply a continuous force maintaining the solidity of the engagement of the ends of the horizontal members 29 and 30 with the studs 27 and 28. After the bands 34 and 35 have been installed, a sheeting panel 37 may be installed, and it will be noted that the panel 37 is offset with respect to the framework of the wall element 20 to the right as shown in Figure 1 so that the edge 38 extends beyond the stud 28, and the edge 39 is positioned somewhat short of the edge of the stud 27. This arrangement is for the purpose of establishing an overlap between the sheeting panels 37 of successive wall units so that the sheeting panel of one unit may overlap and be nailed into the studs of the adjacent panel unit.

Referring to Figures 4 through 10, inclusive, the wall element 40 is based upon a framework formed by the studs 41 and 42, the spaced vertical members 43, 44, 45, and 46, the upper and lower members 47 and 48, respectively, and the horizontal members 49 and 50. As in the modification previously described, the horizontal members 49 and 50 are received within suitable slots in the studs 41 and 42. Constricting bands 51 and 52 maintain the engagement of the horizontal members 49 and 50 with the studs 41 and 42, and thereby maintain the alignment of the framework sufficiently to assure the continued operating characteristics of the adjustable window unit indicated at 53. The structure centering around the adjustable window unit is best illustrated in Figure 6. Spacing strips as shown at 54 are provided to permit the engagement of the sheeting panel 55 of adjacent wall components, and molding strips 56 are secured to the studs 41 and 42 to provide a backing against which the window unit closes.

Since the upper surface of the horizontal member 50 (the sill of the window) is exposed to the elements, it is preferable that the window opening be sealed against rain and wind. To serve this function, a resilient weather stripping member 57 formed preferably of sheet aluminum in the configuration shown in Figure 5 is interposed not only for the purpose of closing the openings between the spacing strip 54 and the molding strip 56 and the stud 41, but also of establishing a resilient member against which the window can be closed with a spring-like action necessary to create a proper seal. The strip member includes a side panel portion 58, the flange 59 received against the outer surface of the spacing strip 54, a reverse-bent portion 60 positioned by the molding strip 56, and a resilient portion 61 against which the window unit 53 actually closes. The space shown at 62 between the edge of the window 53 and the portion 58 of the strip member is provided for accommodating the operating hardware associated with the window. The number of fitted joints involved in the structure shown in Figure 6 makes it vital that the framework of the wall element be installed in proper rectangular relationship to maintain the operating characteristics of the window, and to prevent opening of the joints and distortion of the various parts. The material of which the strip member 58 is formed is preferably sufficiently thin that nails can easily be driven through it, and any tendency of the entire assembly to be displaced from proper alignment is certain to distort not only the joints but also the fastenings which maintain the position of the sheet metal sealing member 57. Reference to Figure 2 of the drawings will illustrate a modified form of sheet metal sealing member utilized in fixed window installations. The member 57a shown in Figure 2 does not include a portion similar to the resilient section 61 shown in Figure 5, but merely serves the function of maintaining an uninterrupted surface free from any openings which will admit either rain or wind.

Referring to Figure 7, an enlarged view is shown which illustrates the joint between the horizontal members and the stud. Lateral displacement of the horizontal member 30 with respect to the stud 27 is prevented by nails as shown at 63, and the pressure established by the band 35 continually urges the end of the horizontal member 30 into solid engagement with the base of the groove in the stud 27 in which the horizontal member 30 is received. Such relationship maintains the alignment of the framework so that the fixed window unit 31 (which is in positive rectangular configuration) will properly fit within its mounting. In addition, the mitre joint indicated at 64 between the molding strips 65 and 66 will be kept properly closed so that a neat appearance is maintained.

Referring to Figures 9 and 10, the drawings illustrate the ability of the band units to accommodate themselves to the shrinkage and expansion inevitably associated with changes in moisture content of the wooden members. The bands themselves are initially straight strips of steel which are wrapped around the framework and tightened as one would wrap a rope around a package. Due to the resistance of any material of this type against bending, the strap initially engages the studs at the corners, with the straps forming themselves on a radius of curvature considerably exceeding that of the corners of the studs. Tension in the bands tends to locally distort the fibers of the studs inwardly. A slight tendency for the straps to bow outwardly as shown at 67 as a result of the bending rigidity of the straps at the corners of the studs can be regarded as a limited degree of "slack" that can accommodate some increase in horizontal dimension across the outside of the panel unit without developing undue stresses in the bands such as might pull the ends loose from the crimped clips. The engagement of the bands with the corners of the studs will also create a cushioning effect as the fibers of the wood are locally distorted. The wood material in this area will also create a resilience which will increase the ability of the band to maintain a considerable constricting force regardless of variations in the dimensions of the overall framework resulting from changes and moisture content. An extreme case of expansion is illustrated in Figure 10 in which the band 52 is urged practically solidly against the face of the stud 42 at the area indicated at 67. As a practical matter, this condition is only approached, and is not fully reached. Before such a situation can take place, the distortion of the fibers of the corners of the stud 42 would be so extensive as to create a curved line of contact between the band 52 and the face of the stud.

A series of various wall elements of types as shown in Figure 1 or 4, or several other possible forms, may be selected as desired and positioned on the sub-floor structure of a house, and are then aligned and supported at the upper portions through the use of a continuous beam (not shown) resting on the upper surface 68 of the wall elements in the space shown in Figure 8 back of the sheeting panel 55. The continuous beam serves the purpose of transferring the vertical stresses from the roof across the openings occupied by the windows 31 and 53 and into the vertical studs 27, 28, 41, and 42. By placing the sheeting panel solidly against the continuous beams, the wall components are firmly established in co-planar relationship.

The particular embodiments of the present invention which have been discussed and illustrated herein are for illustrative purposes only and are not to be considered as a limitation upon the scope of the appended claims. In these claims, it is my intension to claim the entire invention disclosed herein except as I am limited by the prior art.

I claim:

1. A structural component panel of a building wall comprising: spaced normally horizontal members; spaced normally vertical members including stud members of rectangular cross-section disposed at the sides of said panel, and engaging the end faces of said normally horizontal members in butt-joint relationship, said stud members having grooves receiving said normally horizontal members; normally horizontal nail means traversing said stud members and engaging the ends of said normally horizontal members; and normally horizontally metallic tension band means surrounding said panel and applying a constricting action thereto urging said stud members firmly against the ends of said normally horizontal members, said band means having junction clip means disposed between said normally vertical members, and said band means engaging the corners of said stud members in a radius of curvature greater than the radius of curvature of the said corners existing prior to the application of said band means.

2. A structural component panel of a building wall comprising: spaced normally horizontal members; spaced normally vertical members including stud members of rectangular cross-section disposed at the sides of said panel, and engaging the end faces of said normally horizontal members in butt-joint relationship; normally horizontal nail means traversing said stud members and engaging the ends of said normally horizontal members; and normally horizontal metallic tension band means surrounding said panel and applying a constricting action thereto urging said stud members firmly against the ends of said normally horizontal members, said band means having junction clip means disposed between said normally vertical members, and said band means engaging the corners of said stud members in a radius of curvature greater than the radius of curvature of the said corners existing prior to the application of said band means.

3. A structural component panel of a building wall comprising: spaced normally horizontal members; spaced normally vertical members including stud members disposed at the sides of said panel, and engaging the end faces of said normally horizontal members in butt-joint relationship; normally horizontal nail means traversing said stud members and engaging the ends of said normally horizontal members; and normally horizontal metallic tension band means surrounding said panel and applying a constricting action thereto urging said stud members firmly against the ends of said normally horizontal members, said band means engaging the corners of said stud members in a radius of curvature greater than the radius of curvature of the said corners existing prior to the application of said band means.

4. A structural component panel of a building wall comprising: spaced normally horizontal members; spaced normally vertical members including stud members disposed at the sides of said panel, and engaging the end faces of said normally horizontal members; and normally horizontal tension band means surrounding said panel and applying a constricting action thereto urging said stud members firmly against the ends of said normally horizontal members.

References Cited in the file of this patent
UNITED STATES PATENTS

| | | |
|---|---|---|
| 1,689,642 | Rappleyea | Oct. 20, 1928 |
| 1,785,863 | Freeze | Dec. 23, 1930 |
| 2,464,153 | Robinson | Mar. 8, 1949 |